United States Patent
Black et al.

(10) Patent No.: US 7,357,302 B2
(45) Date of Patent: Apr. 15, 2008

(54) SELF SERVICE TERMINAL

(75) Inventors: Jonathan S. Black, Dundee (GB); Martin R. Smith, Dundee (GB); Neil A. Strachan, Fife (GB)

(73) Assignee: NCR Corporation, Dayton, OH (US)

( * ) Notice: Subject to any disclaimer, the term of this patent is extended or adjusted under 35 U.S.C. 154(b) by 492 days.

(21) Appl. No.: 10/732,654

(22) Filed: Dec. 10, 2003

(65) Prior Publication Data

US 2004/0118911 A1 Jun. 24, 2004

(30) Foreign Application Priority Data

Dec. 14, 2002 (GB) .................................. 0229227.4

(51) Int. Cl.
- *G06Q 40/00* (2006.01)
- *G07D 11/00* (2006.01)
- *G07F 19/00* (2006.01)

(52) U.S. Cl. ....................................... 235/379; 235/381

(58) Field of Classification Search ........ 235/378–381, 235/375, 383; 705/14, 16, 20–24, 26, 30, 705/64, 73; 709/219, 206, 204; 455/403, 455/406, 408, 466, 422
See application file for complete search history.

(56) References Cited

U.S. PATENT DOCUMENTS

| | | | | |
|---|---|---|---|---|
| 5,473,143 A | * | 12/1995 | Vak et al. | ..................... 235/380 |
| 5,914,654 A | * | 6/1999 | Smith | .......................... 340/438 |
| 5,933,813 A | * | 8/1999 | Teicher et al. | ................. 705/26 |
| 6,236,330 B1 | * | 5/2001 | Cohen | ..................... 340/691.6 |
| 6,309,117 B1 | * | 10/2001 | Bunce et al. | .................. 400/61 |
| 6,499,021 B1 | * | 12/2002 | Abu-Hakima | ................. 706/10 |
| 6,633,759 B1 | * | 10/2003 | Kobayashi | ................... 455/419 |
| 6,644,549 B1 | * | 11/2003 | Swartz | ................... 235/472.01 |
| 6,757,365 B1 | * | 6/2004 | Bogard | ..................... 379/88.17 |
| 7,020,685 B1 | * | 3/2006 | Chen et al. | .................. 709/204 |
| 2002/0035546 A1 | * | 3/2002 | Aoki | ........................... 705/52 |
| 2002/0184096 A1 | * | 12/2002 | Kawahara et al. | ............ 705/14 |

FOREIGN PATENT DOCUMENTS

| | | |
|---|---|---|
| EP | 1 134 705 A2 | 9/2001 |
| GB | 2 379 066 A | 2/2003 |
| JP | 100149400 A | 2/1998 |
| WO | WO 01/75819 A1 | 10/2001 |

* cited by examiner

*Primary Examiner*—Michael G. Lee
*Assistant Examiner*—Kumiko C. Koyama
(74) *Attorney, Agent, or Firm*—Michael Chan

(57) ABSTRACT

A self-service terminal that is adapted to: receive a text message, in particular an SMS message, from a mobile telecommunications device; interpret the received text message, and provide information or a service in response to the received text message. Preferably, the information is printed out and the print out is provided to the customer.

9 Claims, 3 Drawing Sheets

SELF SERVICE TERMINAL

BACKGROUND OF THE INVENTION

The present invention relates to a self-service terminal (SST), such as an automated teller machine (ATM), and a method for accessing information or services from such a terminal.

Self-service terminals such as ATMs currently provide many services, most of which relate to financial transactions. In the increasingly competitive banking arena, financial service providers are continually looking for innovative new services to include in their SSTs in order to differentiate them from their competitors. However, in practice including new services in SST networks can be difficult, particularly for ATM networks. This is because the inclusion of such new services invariably requires changes to the existing ATM infrastructure. Whilst service providers find the idea of including new services on their ATMs appealing, they are reluctant to do this at the expense of any disruption to their existing networks.

SUMMARY OF THE INVENTION

An object of the present invention is to provide a mechanism for allowing additional services to be provided at a self-service terminal.

According to one aspect of the present invention, there is provided a self-service terminal that is adapted to: receive an audio or text message from a mobile telecommunications device; interpret the received audio or text message, and provide information or a service in response to the received message.

By allowing customers to interact with the SST via a mobile device, such as a mobile telephone, additional services can be provided via the telecommunications network, without disrupting the existing financial network.

By self-service terminal, it is meant a terminal or device that can be used by a customer to access information or services. This includes, but is not restricted to automated teller machines that are able to dispense cash and point of sales terminals or kiosks.

Where the message is a text message, for example a SMS message, the self-service terminal may include a receiver for receiving the text message and a computer program for interpreting the received message and causing the information and/or service to be provided.

Where the message is an audio message, the self-service terminal includes speech recognition software for interpreting the message and a computer program for causing the information and/or service to be provided. The speech recognition software and computer program may be provided as a single integrated computer program or may be provided separately.

The self-service terminal may include a printer. The terminal may be adapted to print out the information requested and provide the printed out information to the customer. In particular, the terminal may include a computer program that is adapted to cause the information to be printed out.

The self-service terminal may be operable to record the details, such as the telephone number, of mobile devices that have been used to access information or services. These details may be used to invoice the customer. Alternatively, where the provider of the terminal has a revenue sharing agreement with, say, mobile telephone providers, revenue could be collected on the basis of a record of the telephone numbers dialed by the user, together with knowledge of the telephone number associated with the terminal.

According to another aspect of the invention, there is provided a method comprising: receiving at a self-service terminal a text or audio message from a mobile telecommunications device; interpreting the received text or audio message, and providing information and/or a service in response to the received text or audio message.

Where the message is an audio message, the method may further involve using speech recognition software for interpreting the message and a computer program for causing the information and/or service to be provided. The speech recognition software and computer program may be provided as a single integrated computer program or may be provided separately.

The method may further involve printing out the information requested and providing the printed out information to the customer.

The method may further involve receiving information from a remote location. This information may be received via the internet or WAP or any other suitable communications channel.

The method may further involve sending a text message from the self-service terminal to the mobile device.

The method may further involve recording the details, such as the telephone number, of mobile devices that have been used to access information or services. These details may be used to invoice the customer.

BRIEF DESCRIPTION OF THE DRAWINGS

Various aspects of the invention will now be described by way of example only and with reference to the accompanying drawings, of which.

DETAILED DESCRIPTION

Figure 1:
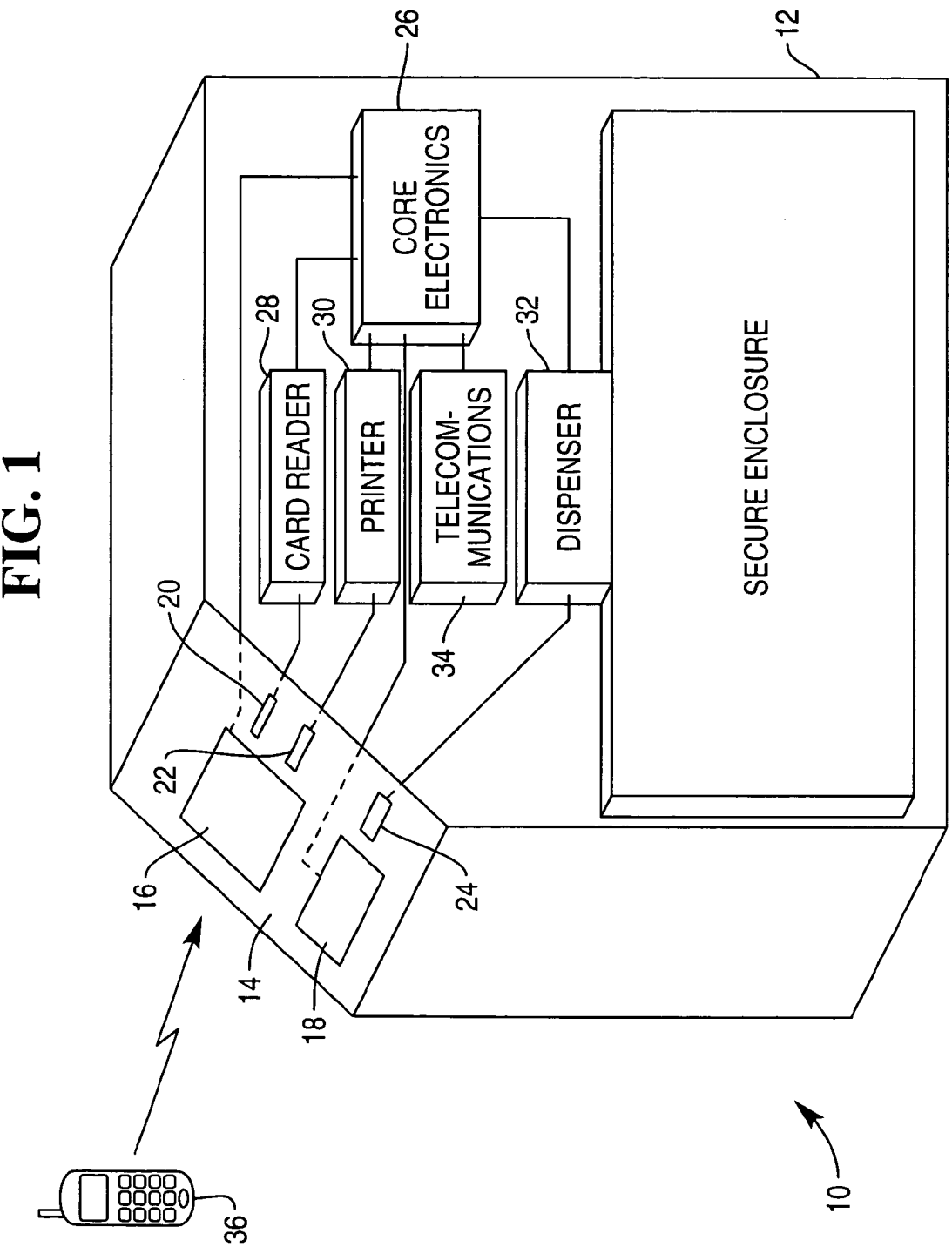
FIG. 1 is a schematic view of an automated teller machine, in which a panel is open to expose a portion of the interior of the machine.

FIG. 1 shows an automated teller machine 10. This has a housing 12 with a front fascia 14 that has a screen 16 for presenting financial information to a customer; a keyboard 18 for receiving user inputs; a card slot 20 for receiving a customer's card; a print-out slot 22 through which printed material is dispensed and a slot 24 for dispensing cash through.

Included in the ATM housing is a control module 26 that is operable to control access to the banking network and any financial transactions. This is connected to each of a card reader mechanism 28 that is aligned with the card slot 20, a printer 30 that is aligned with the print out slot 22 and a dispensing mechanism 32 that is aligned with the dispensing slot 24. The card reader mechanism 28 is operable to receive and read cards that are inserted into the slot 20. Information read from the card by the card reader 28 can be transmitted to the control module 26 for further processing. The printer 30 is operable to print out financial information, such as bank statements, under the control of the control module 26. The dispensing mechanism 32 is operable to dispense cash that is stored in a secure enclosure, again under the control of the control module 26.

All of the previously described features of FIG. 1 are commonplace in ATMs and so will not be described in detail. In the present case, however, also included in the machine of FIG. 1 is a wireless communications module 34 for allowing communication between the ATM 10 and a mobile device 36, such as a mobile telephone.

Figure 2:
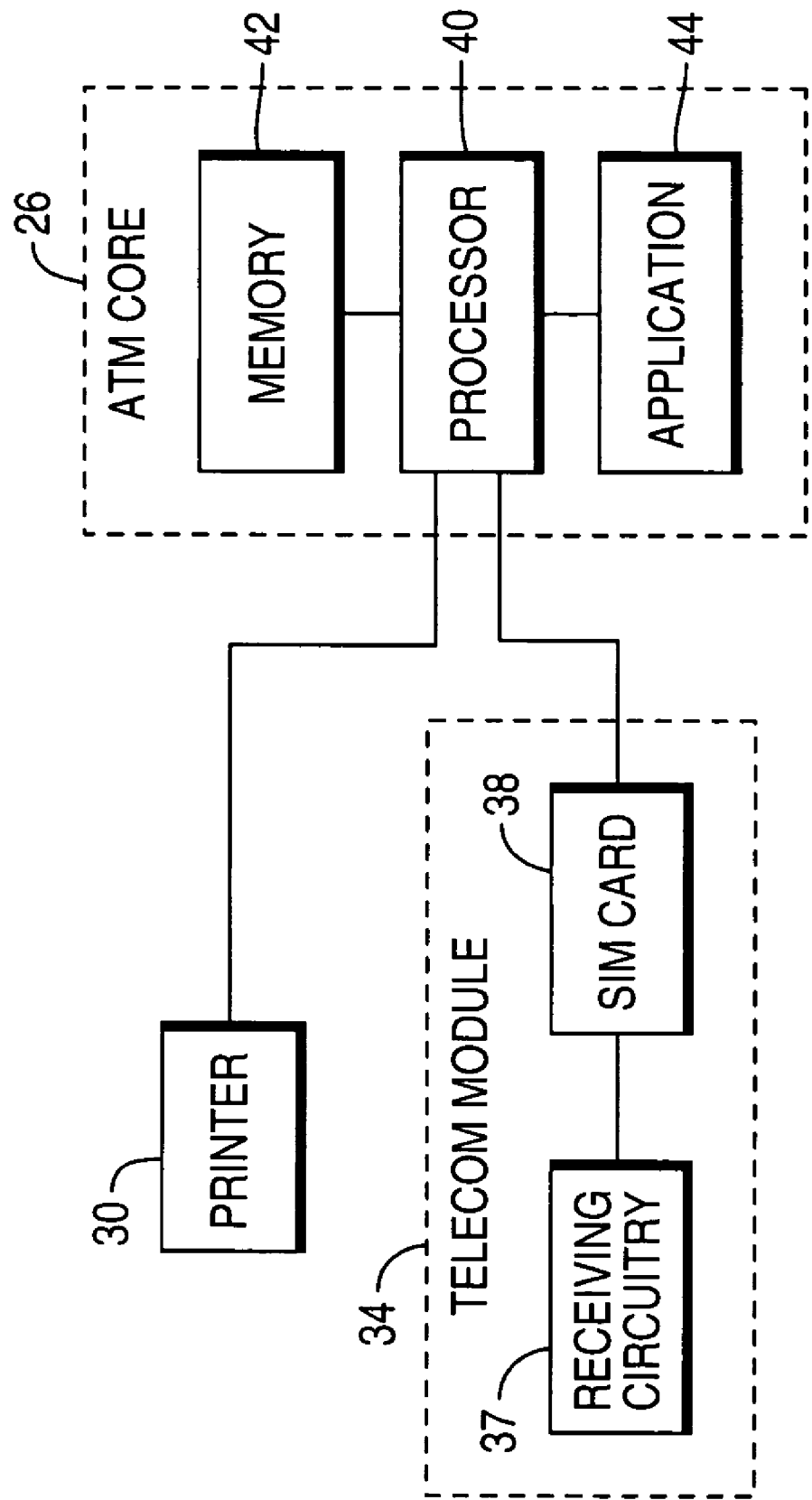
FIG. 2 is a block diagram of a mobile communications module and a core processing module that are provided in the ATM of FIG. 1.

The wireless communications module 34 is shown in more detail in FIG. 2. This includes a receiver 37 for receiving signals from a wireless device, such as a mobile telephone, via a telecommunications network and a communication port or connector, such as a SIM card 38, for allowing the terminal 10 access to the telecommunications network. The wireless communications module 34 is connected to a processor 42 that is provided in the ATM core module 26. Also included in the ATM core 26 is a software application space 44 that includes a computer program for allowing access to the stored information and a memory 42 for storing information for presenting to a user. The core processor 40 is operable to communicate with each of the SIM card 38 and the memory 42 and is configured to run the computer program. The processor 40 is also connected to the printer 30 and is operable to send print control commands thereto. It should be noted that the core processor 40 is operable to control other functionality in the ATM 10 and is not dedicated for use with the telecommunications module 34.

The control program stored in the ATM core 26 is operable to control the provision of information to customers in response to requests received via SMS messages. To this end, the program is adapted to interpret text messages received at the SIM card 38; identify the information requested by the customer and cause the printer 30 to provide printed out information to a user in response to a text messages received at the SIM card 38. In this way, a customer can interact with the terminal 10 and receive information therefrom merely by using a mobile telephone 36.

In order to allow the computer program to identify the information requested, the information available is stored in the memory 42 in association with specific keywords. For example, the keyword "news" is used to identify information relating to current news; the keyword "football" is used to identify the latest football scores and the keyword "Pisces" is used to identify the current Pisces horoscope. In this way, when a text message is received from a customer containing the keyword "news" the computer program recognizes this as a request for the information associated with the word "news" and retrieves this information from the ATM core memory 42. Once the information is retrieved, it is forwarded to the printer 30 for printing.

Typically, the keywords are provided in signs (not shown) that are presented on the front face 14 of the terminal 10, so that they can be readily identified by customers, together with an indication of the information associated with them. Additionally or alternatively, the keywords and a description thereof may be included on the ATM's "idle attract" screens. These are screens that are presented when the ATM 10 is not being used. Additionally or alternatively, the keywords may be printed on the back of a customer's normal receipt, thereby to advertise the service for subsequent use.

The information that is available to the user can be provided to the self-service terminal 10 in various ways, depending on the nature of the self-service terminal. For example, if the self-service terminal is WAP enabled or connected to the internet, information could be downloaded via any suitable internet communication channel. For WAP enabled telephones, the information would be provided as WAP content. Alternatively, the information could be provided over the telecommunications network via the SIM card. In many cases, it is likely that the data received may have to be reformatted in order for it to be printed in a suitable manner. Methods for reformatting data of this nature are well known and so will not be described herein in detail.

Figure 3:
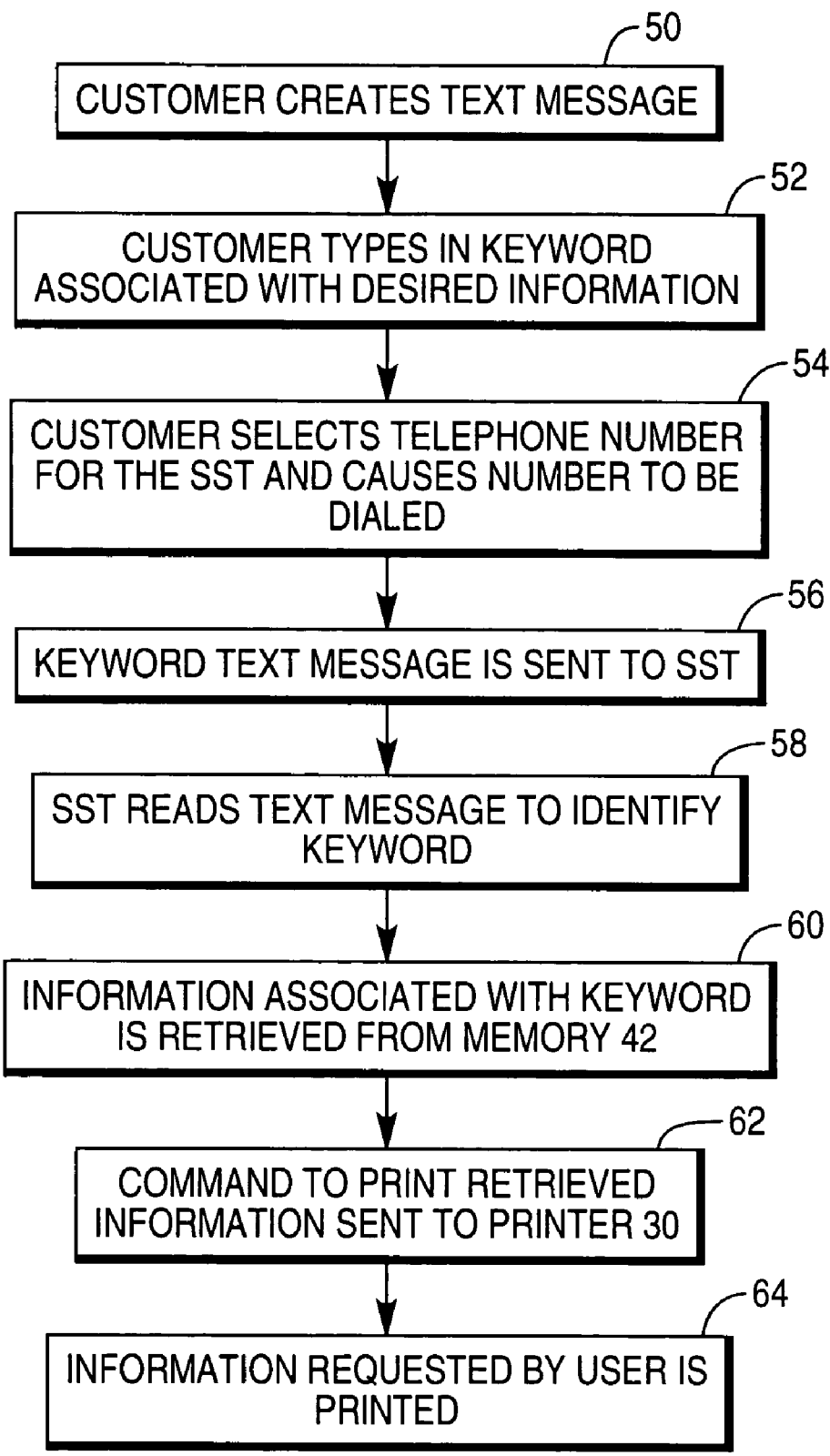
FIG. 3 is a flow diagram of the steps taken to provide information to a customer.

FIG. 3 shows the steps that are required to provide information to a customer. The first step involves the customer selecting the information desired. If the latest football results are wanted, the customer has to create a text message 50 using his mobile telephone. Then, the keyword "football" in typed into the message window 52. Then the customer has to dial the telephone number 54 associated with the SST 10. Typically, this is provided on signs that are presented on the terminal. Once the number is dialed and a connection made with the SST's SIM card, the text message is sent. The computer program in the ATM core 26 is adapted to query the SIM card 38 to determine whether a text message has been received. Alternatively, the SIM card 38 could be adapted to send a signal to the computer program notifying it of the existence of the message. In either case, once it is determined that a message is received, the program retrieves and processes that message, thereby to identify the keyword, in this case "football". The computer program recognizes this keyword message as a request for the latest football results. The program then retrieves the information 60 associated with the keyword from the memory 42 and forwards it to the printer 30 together with a command to print 62. Once this is done, the printer 30 prints out the desired information 64. The print out is then dispensed to the customer through the print-out slot 22.

Each time a mobile device 36 is used to access information or services, the self-service terminal 10 records the details of the device 36, such as the telephone number. These details may be used to invoice the customer. Where the provider of the terminal 10 has an agreement with the mobile telephone company, charges for providing the information via the SST may be included in the customer's mobile telephone bill and passed onto the SST provider later. Of course, where the telephone number of the ATM is known by the mobile telephone company, it is not necessary for the ATM provider to records details of all transactions. Instead, users could be billed merely on the basis of the mobile telephone company's record of when the ATM number is dialed.

In order to further enhance functionality, the self-service terminal 10 may be operable to send text messages to the mobile telephone 36 from which it received the original request for information. For example, if the printer 30 is already involved in printing out other information when a request is received from a mobile device 36, the self-service terminal 10 may be adapted to send the user's mobile device 36 a text message confirming receipt of the initial keyword message and saying that the information requested will be printed out at a certain time.

By providing the SST 10 of the invention with the capability for communicating with a mobile telephone or similar wireless telecommunication devices, there is provided a simple mechanism for allowing customers to access additional services, without causing any disruption to the financial services network. This is advantageous.

Whilst the example described with reference to FIGS. 1 to 3 uses text messaging, in particular SMS messaging, to communicate with the self-service terminal, it will be appreciated that the invention could equally be implemented by allowing the terminal to receive and interpret audio messages. To do this, the self-service terminal would include interactive speech recognition software (not shown in the drawings) for identifying audio or voice messages received from a customer and then taking appropriate action. In this case, rather than sending a text message to the terminal, the customer would dial the number of the terminal and once a connection is made, say out loud the keyword associated with the information desired. This spoken keyword is then stored and identified by the speech recognition software. As before, the identified keyword is used to find the appropriate information, which is then provided to the customer.

A skilled person will appreciate that variations of the disclosed arrangements are possible without departing from the invention. For example, whilst in the examples described keywords are used by the customer to identify the information desired, any other suitable identifiers could be used, such as picture messages or numbers. In addition, whilst the telecommunications module 34 of FIG. 2 is connected to and interrogated by components in the ATM core 26, the processor, control application and memory could be provided within the communications module 34 itself. In this case, the telecommunications module 34 would additionally include a port for allowing the processor to communicate with the printer 30, so that when information is selected using a text message, a command can be sent from the processor in the module 34 to cause that information to be printed out. Furthermore, although in the specific embodiments described a SIM card is used, it will be appreciated that cards of this nature are currently only used in Europe and for GSM based systems, and so any other communication port that allows access to a mobile telecommunications network could be used. Accordingly, the above description of a specific embodiment is made by way of example only and not for the purposes of limitation. It will be clear to the skilled person that minor modifications may be made without significant changes to the operation described.

What is claimed is:

1. A method of operating a publicly accessible self-service terminal to provide an information product to a customer at the publicly accessible self-service terminal in response to the customer requesting comprising:
    receiving an audio request message which is other than a password or personal identification number (PIN) from the customer via a mobile telecommunications device used by the customer;
    identifying a keyword within the audio request message which is other than a password or PIN;
    retrieving an information product which is based upon a keyword identified within the request message and which is different from the identified keyword;
    delivering the retrieved information product to the customer at the publicly accessible self-service terminal;
    recording details of the mobile telecommunications device used by the customer; and
    invoicing the customer based upon details of the mobile telecommunications device used by the customer.

2. A method as claimed in claim 1, further comprising sending a confirmation message from the publicly accessible self-service terminal to the mobile telecommunications device used by the customer to confirm the receipt of the request message therefrom.

3. A method as claimed in claim 1, further comprising information from a remote location to incorporate into the information product delivered to the customer.

4. A method as claimed in claim 3, wherein the information from the remote location is received via a WAP communication channel.

5. A method as claimed in claim 1, wherein the publicly accessible self-service terminal comprises an automated teller machine (ATM).

6. A method as claimed in claim 1, wherein the publicly accessible self-service terminal comprises a point of sale (POS) terminal.

7. A method of operating an automated teller machine (ATM) to provide an information product to an ATM customer at the ATM in response to the ATM customer requesting the information product, the method comprising:
    receiving an audio message which is other than a password or personal identification number (PIN) from the ATM customer via a mobile telephone used by the customer;
    identifying a keyword within the audio message which is other than a password or PIN;
    retrieving an information product which is based upon the keyword identified within the audio message and which is different from the identified keyword;
    delivering the retrieved information product to the ATM customer at the ATM;
    recording details of the mobile telephone used by the ATM customer; and
    invoicing the ATM customer based upon details of the mobile telephone used by the ATM customer.

8. A method according to claim 7, wherein delivering the retrieved information product to the ATM customer at the ATM comprises printing a copy of the information product for the ATM customer.

9. A method according to claim 7, wherein delivering the retrieved information product to the ATM customer at the ATM comprises, displaying the information product for the ATM customer.

* * * * *

UNITED STATES PATENT AND TRADEMARK OFFICE
CERTIFICATE OF CORRECTION

PATENT NO. : 7,357,302 B2  
APPLICATION NO. : 10/732654  
DATED : April 15, 2008  
INVENTOR(S) : J. S. Black, M. Smith and N. Strachan Page 1 of 1

It is certified that error appears in the above-identified patent and that said Letters Patent is hereby corrected as shown below:

Column 5, Line 41, after "requesting" insert --the information product, the method--.

Column 6, Line 47, after "comprises" delete ",".

Signed and Sealed this

Second Day of December, 2008

JON W. DUDAS  
*Director of the United States Patent and Trademark Office*